US012308570B2

(12) United States Patent
Wu et al.

(10) Patent No.: US 12,308,570 B2
(45) Date of Patent: May 20, 2025

(54) ELECTRIC CONNECTING DEVICE

(71) Applicant: Drapho Electronics Technology.,Ltd, Suzhou (CN)

(72) Inventors: ZhuPing Wu, Suzhou (CN); ZhiHong Fang, Suzhou (CN)

(73) Assignee: Drapho Electronics Technology., Ltd, Suzhou (CN)

(*) Notice: Subject to any disclaimer, the term of this patent is extended or adjusted under 35 U.S.C. 154(b) by 387 days.

(21) Appl. No.: 17/934,084

(22) Filed: Sep. 21, 2022

(65) Prior Publication Data

US 2023/0087812 A1 Mar. 23, 2023

(51) Int. Cl.
*H01R 13/631* (2006.01)
*H01R 13/115* (2006.01)
*H01R 27/02* (2006.01)

(52) U.S. Cl.
CPC ......... *H01R 13/631* (2013.01); *H01R 13/115* (2013.01); *H01R 27/02* (2013.01)

(58) Field of Classification Search
CPC ...... H01R 13/631; H01R 13/60; H01R 13/62; H01R 13/116; H01R 27/02
USPC ......... 439/374, 541.5, 540.1, 630, 631, 638, 439/660, 676, 686
See application file for complete search history.

(56) References Cited

U.S. PATENT DOCUMENTS

| | | | | |
|---|---|---|---|---|
| 5,161,997 A * | 11/1992 | Defibaugh ........... | H01R 13/518 248/222.51 |
| 5,685,739 A * | 11/1997 | Davis ................. | H01R 13/6582 439/607.38 |
| 6,168,462 B1 * | 1/2001 | Liao ................... | H01R 12/7029 439/541.5 |
| 6,203,335 B1 * | 3/2001 | Chang .................... | H01R 43/24 439/79 |
| 6,231,390 B1 * | 5/2001 | Chang .................. | H01R 13/658 439/607.01 |
| 6,319,063 B1 * | 11/2001 | Huang ................. | H01R 13/659 439/607.34 |
| 6,347,960 B1 * | 2/2002 | Chen ...................... | H01R 13/64 439/669 |

(Continued)

FOREIGN PATENT DOCUMENTS

| | | |
|---|---|---|
| CN | 215451807 U | 1/2022 |
| CN | 215989346 U | 3/2022 |
| CN | 215989558 U | 3/2022 |

*Primary Examiner* — Harshad C Patel
(74) *Attorney, Agent, or Firm* — Andrus Intellectual Property Law, LLP

(57) ABSTRACT

An electric connecting device includes an insulator with a front end abutting surface and a rear end mounting surface, a terminal module and a USB plugging module in the insulator. A first plugging cavity and a second plugging cavity distributed in a horizontal direction and a guide hole between them are arranged in the insulator. The first plugging cavity and the second plugging cavity forwardly penetrate through the front end abutting surface and form a round interface and a USB interface respectively. By simultaneously providing the two plugging cavities on the insulator, two different plugging functions can be satisfied. The transmission of a DC power supply and the transmission of a USB signal are realized at the same time. The integrated structure can reduce the occupation of a circuit board space and the assembly cost of the product.

9 Claims, 8 Drawing Sheets

(56) References Cited

U.S. PATENT DOCUMENTS

| | | | | |
|---|---|---|---|---|
| 6,722,924 | B1 * | 4/2004 | Zhou | H01R 13/659 439/607.23 |
| 6,758,685 | B1 * | 7/2004 | Huang | H01R 12/712 439/79 |
| 6,939,177 | B2 * | 9/2005 | Kato | H01R 27/02 439/638 |
| 7,052,329 | B2 * | 5/2006 | Belopolsky | H01R 12/721 439/620.21 |
| D538,233 | S * | 3/2007 | Wan | D13/147 |
| 7,402,078 | B2 * | 7/2008 | Wan | H01R 13/6594 439/607.17 |
| 7,578,705 | B2 * | 8/2009 | He | H01R 13/514 439/660 |
| 7,614,920 | B1 * | 11/2009 | Yi | H01R 12/712 439/682 |
| 7,758,380 | B2 * | 7/2010 | Wang | H01R 13/6461 439/541.5 |
| 7,997,927 | B2 * | 8/2011 | Wan | H01R 27/02 439/541.5 |
| 8,038,474 | B2 * | 10/2011 | Ju | H01R 12/712 439/607.01 |
| 8,241,063 | B2 * | 8/2012 | Nagata | H01R 12/724 439/680 |
| 8,721,353 | B2 * | 5/2014 | Xu | H01R 24/76 439/108 |
| 8,848,387 | B2 * | 9/2014 | Nagata | H01R 13/6594 361/767 |
| 9,077,136 | B2 * | 7/2015 | Yang | H01R 43/20 |
| 9,419,366 | B2 * | 8/2016 | Barrefelt | H01R 13/04 |
| 10,446,986 | B2 * | 10/2019 | Zhong | H01R 13/6585 |
| 2010/0062653 | A1 * | 3/2010 | Mao | H01R 12/712 439/660 |
| 2012/0196490 | A1 * | 8/2012 | De Blieck | H01R 43/16 439/681 |
| 2014/0194008 | A1 * | 7/2014 | Locker | H01R 12/724 439/638 |
| 2014/0295693 | A1 * | 10/2014 | Zhang | H01R 12/7088 439/374 |

* cited by examiner

ELECTRIC CONNECTING DEVICE

FIELD OF THE INVENTION

This application claims the benefit of Chinese Patent Application No. 202111109688.3, filed on Sep. 23, 2021, entitled "electric connecting device," which is incorporated herein by reference in its entirety.

BACKGROUND OF THE INVENTION

With the development trend of miniaturization and thinning of consumer electronics such as laptop computers, tablet computers, and mobile phones, the requirements for the design and manufacturing process of their components are increasing. Due to increasing thinness of the product, its internal space has become smaller, which requires a dense layout inside the product. As the volume of various electronic parts is getting smaller and thinner, the requirements for the reliability of process technology and product connection are increasing. Many of the existing electric connectors are relatively small in volume, low in height, relatively single in function, and in general, the electric connectors can only be in fit and butt-joint with a butt-joint end electric connector or a butt-joint element. However, in some special application scenarios, in order to achieve multi-functional requirements, it often needs to plug a plurality of butt-joint components simultaneously in the only space available on the circuit board, and due to the limitation of space, the simultaneous mounting of a plurality of electric connectors cannot be achieved under the circumstance.

SUMMARY OF THE INVENTION

A technical problem to be solved by the present disclosure is to provide an electric connecting device to modify the problem that an electric connector in the prior art is single in function and limited in mounting space.

To solve the technical problem above, the present disclosure adopts the following technical solutions: an electric connecting device includes an insulator, a terminal module housed in the insulator, and a USB plugging module installed in the insulator, wherein the insulator is provided with a front end abutting surface and a rear end mounting surface. A first plugging cavity and a second plugging cavity distributed in a horizontal direction and a guide hole between the first plugging cavity and the second plugging cavity are arranged in the insulator. The first plugging cavity forwardly penetrates through the front end abutting surface and forms a round interface on the front abutting surface. The second plugging cavity forwardly penetrates through the front end abutting surface and forms a USB interface on the front end abutting surface. The round interface, the guide hole and the USB interface are linearly arranged from left to right.

Further, the front end abutting surface of the insulator is rectangular, and the insulator is further provided with a top surface and a pair of side surfaces. A through hole is formed on the top surface and downwardly penetrates through the first plugging cavity.

WOO. Further, a mounting port recessed inwards is provided on the rear end mounting surface of the insulator, and a stop portion is arranged in the mounting port. The USB plugging module is housed in the mounting port, and is further provided with a butt-joint portion plugged into the second plugging cavity and a limiting portion abutting against the stop portion.

Further, the insulator is further provided with a protrusion portion protruding backwards beyond the rear end mounting surface. The protrusion portion is provided with an inverted U-shaped slot, an inner slot and a central slot located inside the inverted U-shaped slot. The inverted U-shaped slot, the inner slot and the central slot all penetrate through the first plugging cavity from the back to the front so as to accommodate the terminal module.

Further, the inverted U-shaped slot includes a pair of side slots and a top slot. The pair of side slots are distributed at a left side and a right side of the central slot. The inner slot is located between the central clot and one of the side slots. The central slot is concave.

Further, the terminal module includes a ground terminal, a power supply terminal, and a detection terminal. The power supply terminal is located at a central position of the round interface. The detection terminal and the ground terminal are lapped with each other.

Further, the ground terminal is provided with a pair of opposite contact arms and a top arm for connecting the two contact arms, The two contact arms are sheet-shaped and respectively plugged in the pair of side slots. The top arm is plugged in the top slot.

Further, one of the two contact arms is provided with a blanking hole and an elastic arm formed in the blanking hole. The elastic arm extends from the front to the back. A front end of the elastic arm is integrally connected to a front end of the contact arm. A rear end of the elastic arm is a free tail end. The free tail end and the detection terminal are lapped with each other.

Further, the electric connecting device further includes a metal housing covering the insulator. The metal housing is provided with a top cover, a pair of side covers and a rear cover. The top cover is provided with a spring sheet extending downward into the first plugging cavity. The rear end mounting surface is covered with the rear cover.

Further, the rear side of the insulator is further provided with a clamping portion protruding from the rear end mounting surface. A clamping groove is formed between the clamping portion and the rear end mounting surface. The edge of the rear cover is clamped in the clamping groove.

Compared with the prior art, by simultaneously providing the first plugging cavity and the second plugging cavity on the insulator, two different plugging functions can be satisfied, and the transmission of a DC power supply and the transmission of a USB signal are realized at the same time. Compared with an electric connecting device divided into two separately electric connectors, the integrated structure of the present disclosure can reduce the occupation of a circuit board space, and can also reduce the assembly cost of the product.

PREFERRED EMBODIMENTS OF THE PRESENT INVENTION

Figure 1:
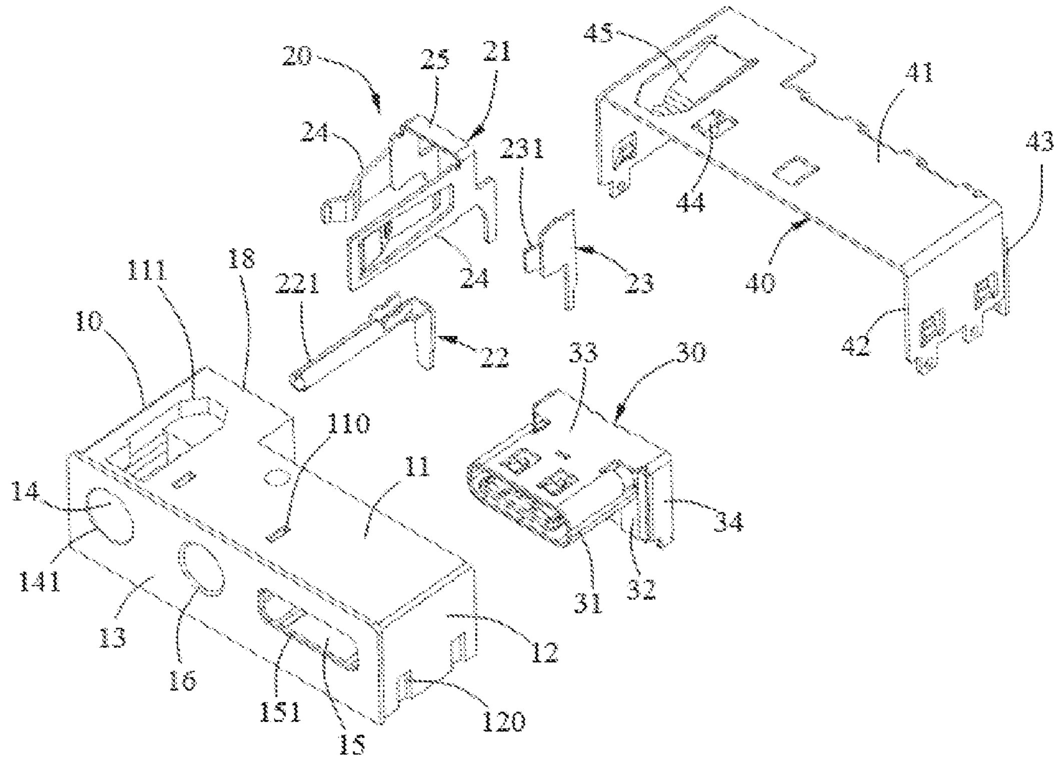
FIG. 1 is an exploded view of an electric connecting device of the present disclosure.
Figure 2:
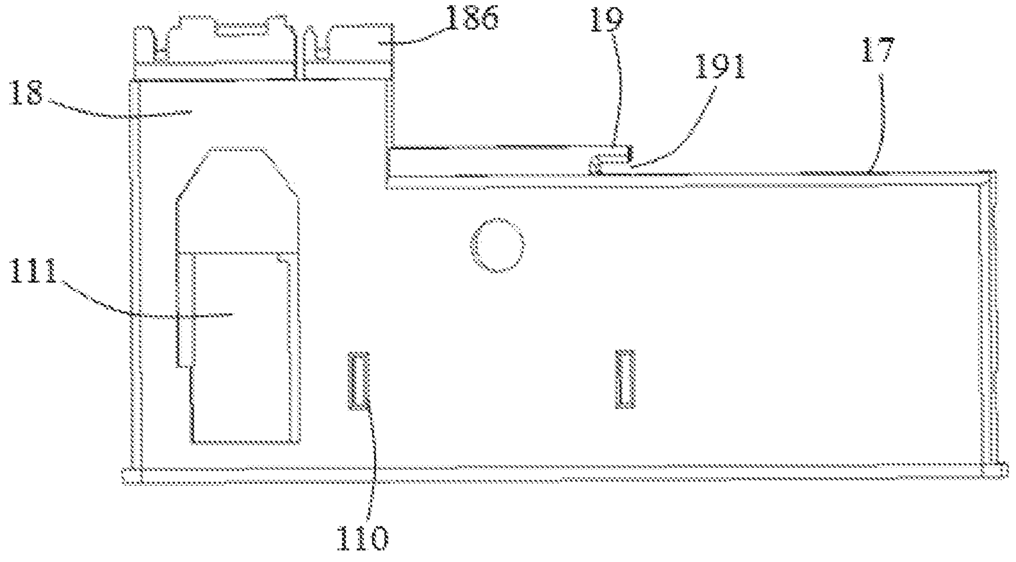
FIG. 2 is a top view of an insulator of an electric device of the present disclosure.
Figure 3:
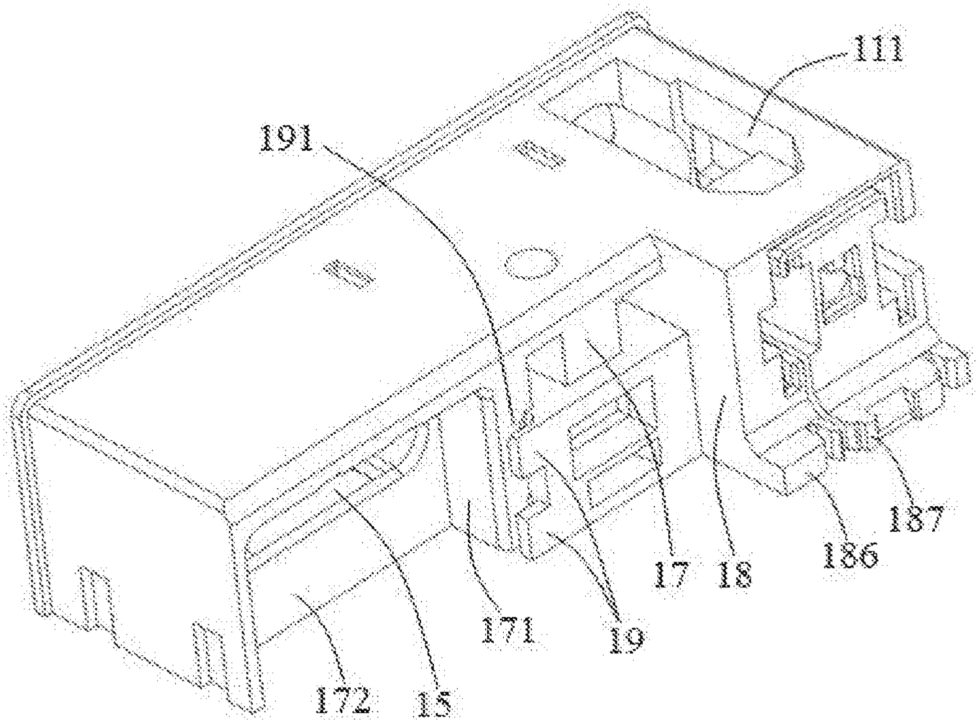
FIG. 3 is a rear side view of an insulator of an electric connecting device of the present disclosure.
Figure 4:
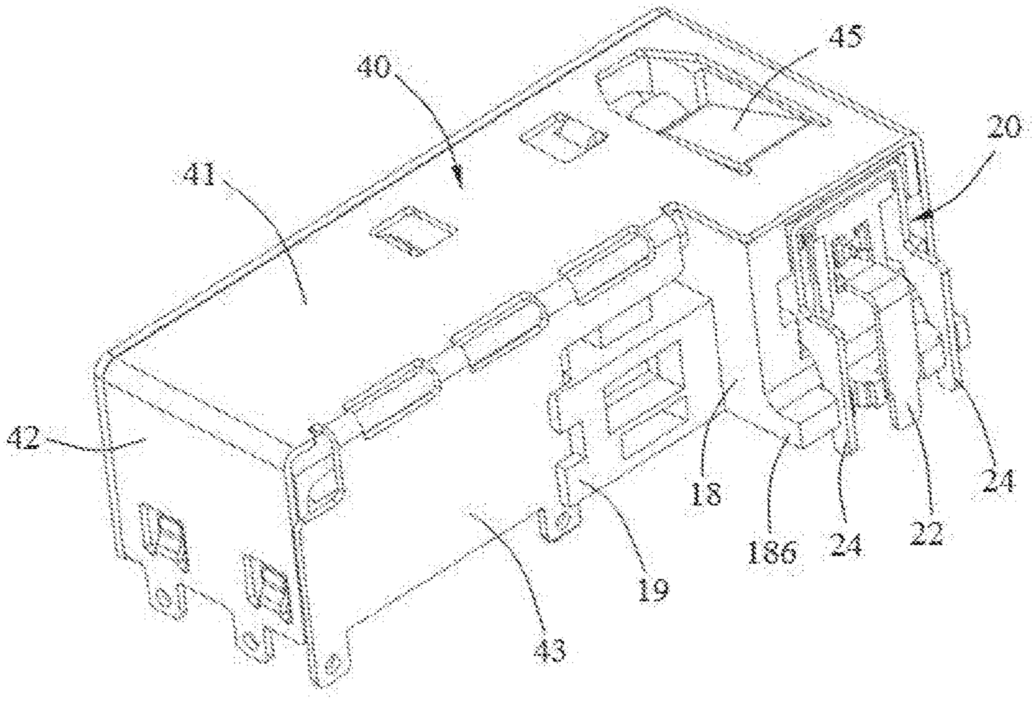
FIG. 4 is a rear side view of an electric connecting device of the present disclosure.
Figure 5:
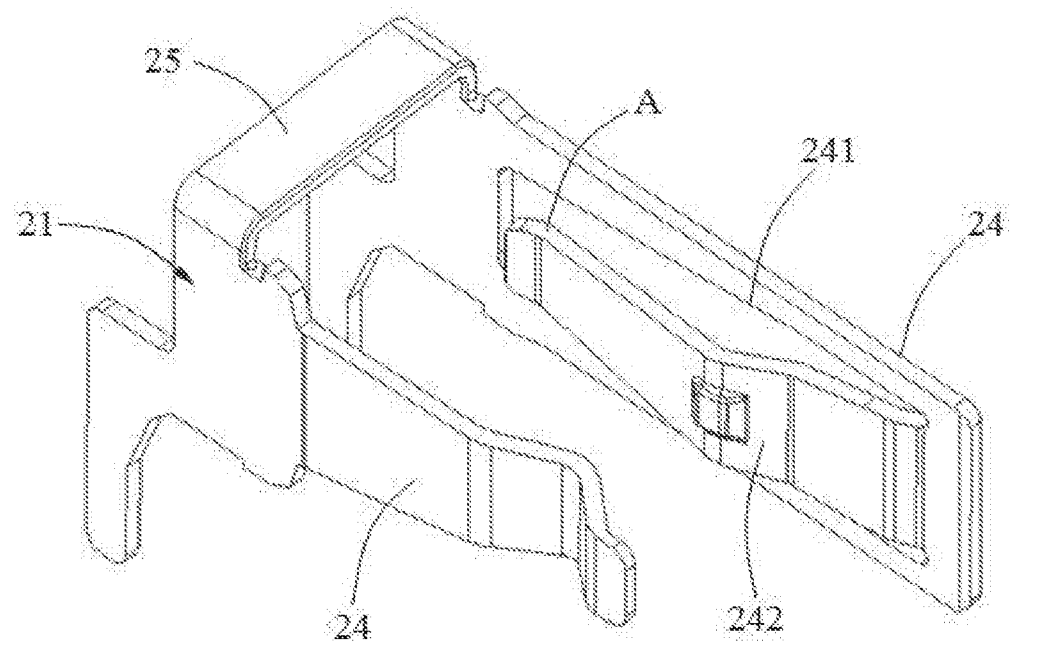
FIG. 5 is a schematic diagram of a ground terminal of an electric connecting device of the present disclosure.
Figure 6:
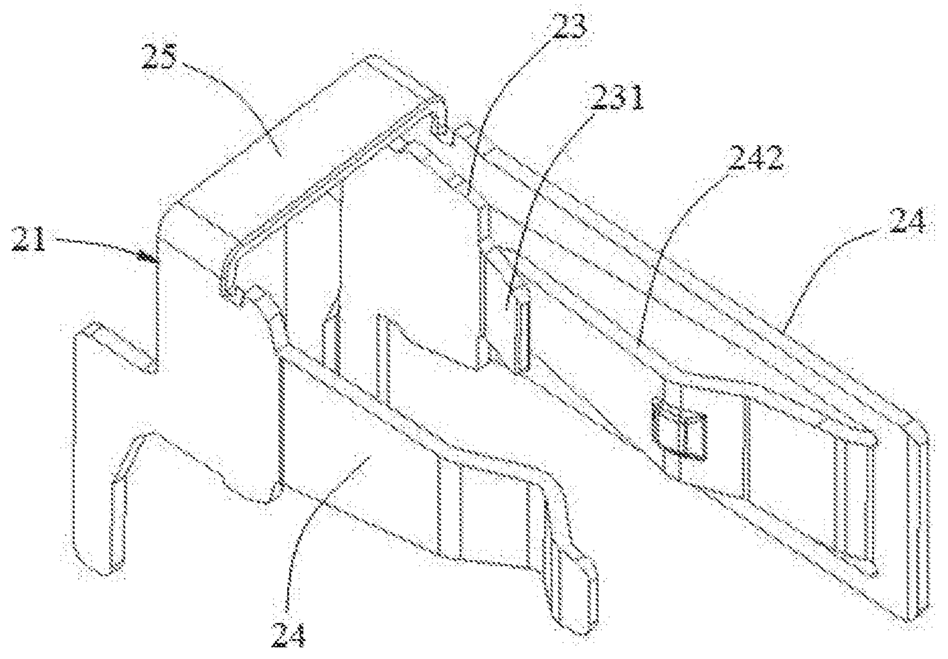
FIG. 6 is a schematic diagram of a positional relationship between a ground terminal and a detection terminal of an electric connecting device of the present disclosure.
Figure 7:
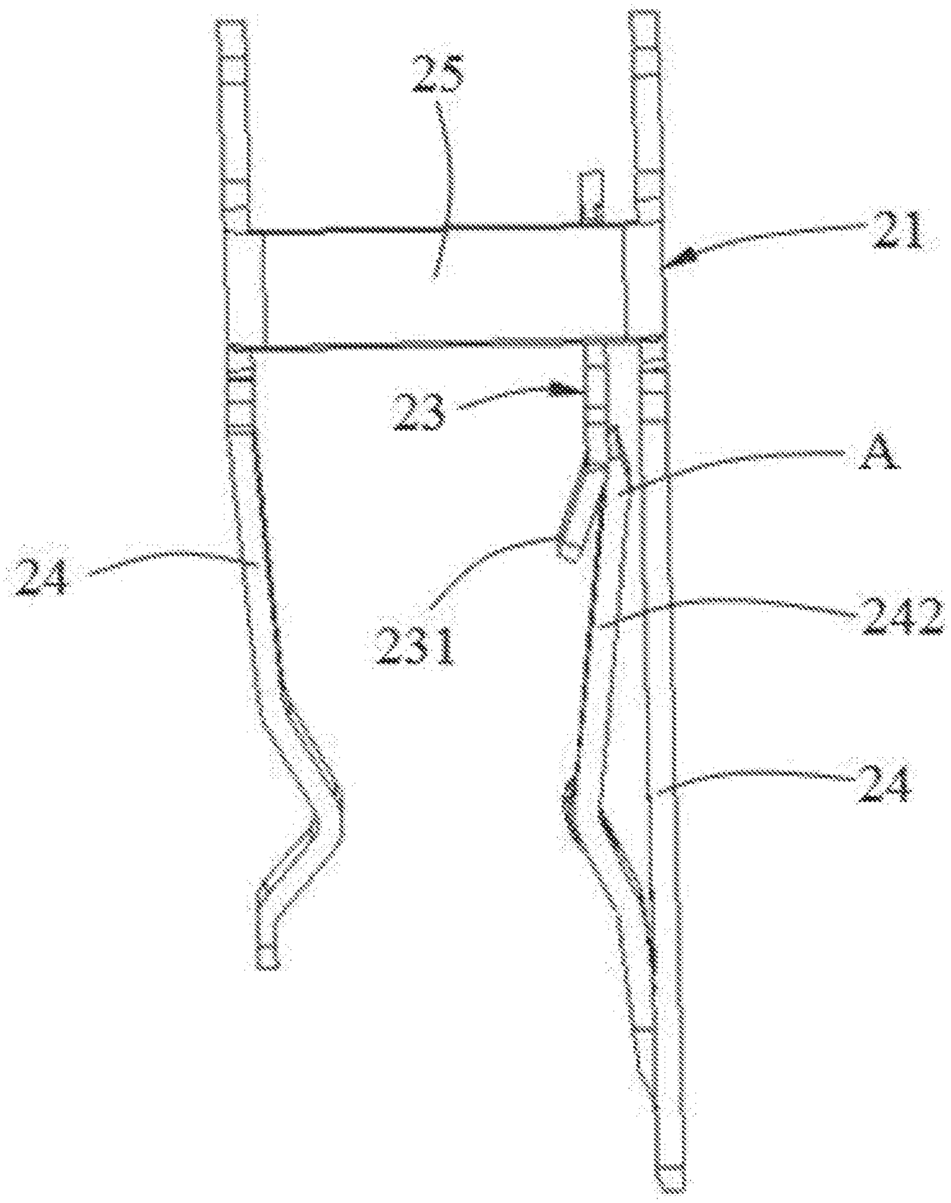
FIG. 7 is a top view of a ground terminal and a detection terminal of an electric connecting device of the present disclosure.

Please refer to FIG. 1 to FIG. 9, an electric connecting device is provided by the present disclosure, which includes an insulator 10, a terminal module 20 housed in the insulator 10, a USB plugging module 30 mounted in the insulator 10, and a metal housing 40 covering the insulator 10. The terminal module 20 is configured to achieve DC power supply transmission, while the USB plugging module 30 is configured to achieve high-speed signal and data transmission.

The insulator 10 is provided with a top surface 11, a pair of side surfaces 12, a front end abutting surface 13, a first plugging cavity 14 and a second plugging cavity 15 formed inside the top surface 11 and the side surfaces 12, and a guide hole 16 between the first plugging cavity 14 and the second plugging cavity 15. Wherein the top surface 11 is provided with a latching groove 110 formed by recessing downwards and a through hole 111. The latching groove 110 is configured to be in snap fit with the metal housing 40. The through hole 111 downwardly penetrates through the first plugging cavity 14 for a spring sheet 45 of the metal housing 40 to extend downwardly into the first plugging cavity 14. The side surfaces 12 are provided with limiting grooves 120 in snap fit with the metal housing 40. The front end abutting surface 13 is rectangular. The first plugging cavity 14 forwardly penetrates through the front end abutting surface 13 and forms a round interface 141 on the front end abutting surface 13. The second plugging cavity 15 forwardly penetrates through the front end abutting surface 13 and forms a flat USB interface 151 on the front end abutting surface 13. The guide hole 16 is formed on the front end abutting surface 13 and extends backwards. And the guide hole 16 is also round and has a guiding function, which is conducive to achieving plugging/assembling rapidly and accurately. The round interface 141, the guide hole 16 and the flat USB interface 151 are sequentially arranged from left to right, and the centers of which are located on the same straight line. Alternately, at least the centers of the round interface 141 and the flat USB interface 151 are located on the same straight line.

Figure 8:
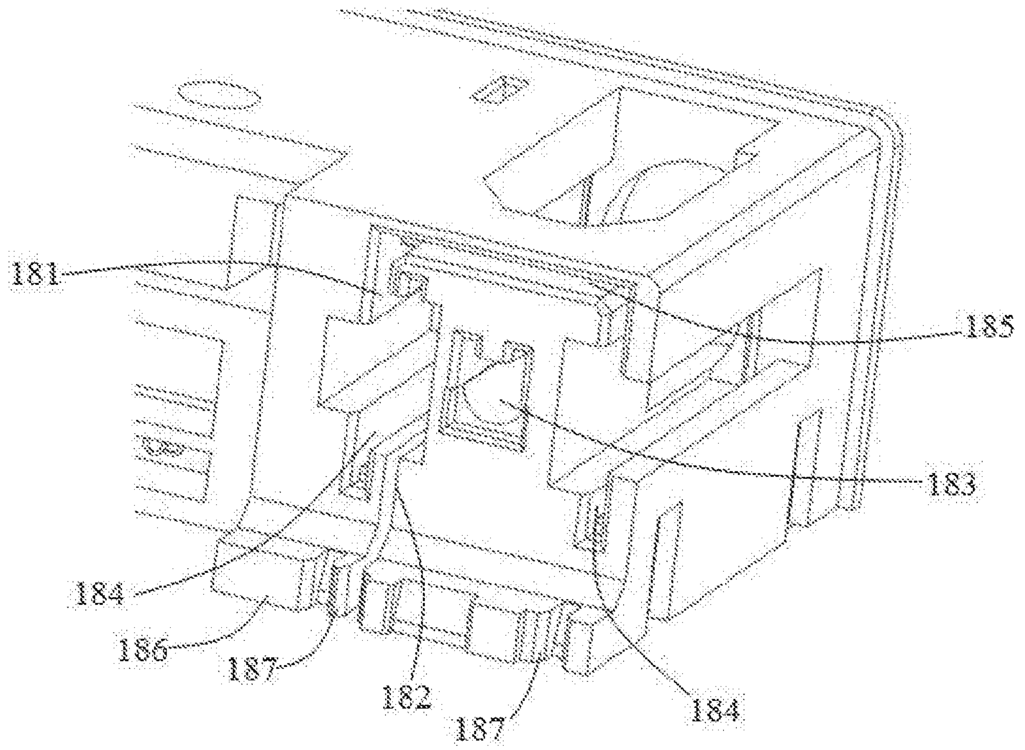
FIG. 8 is a partial view of a rear side position of an insulator of an electric connecting device of the present disclosure.
Figure 9:
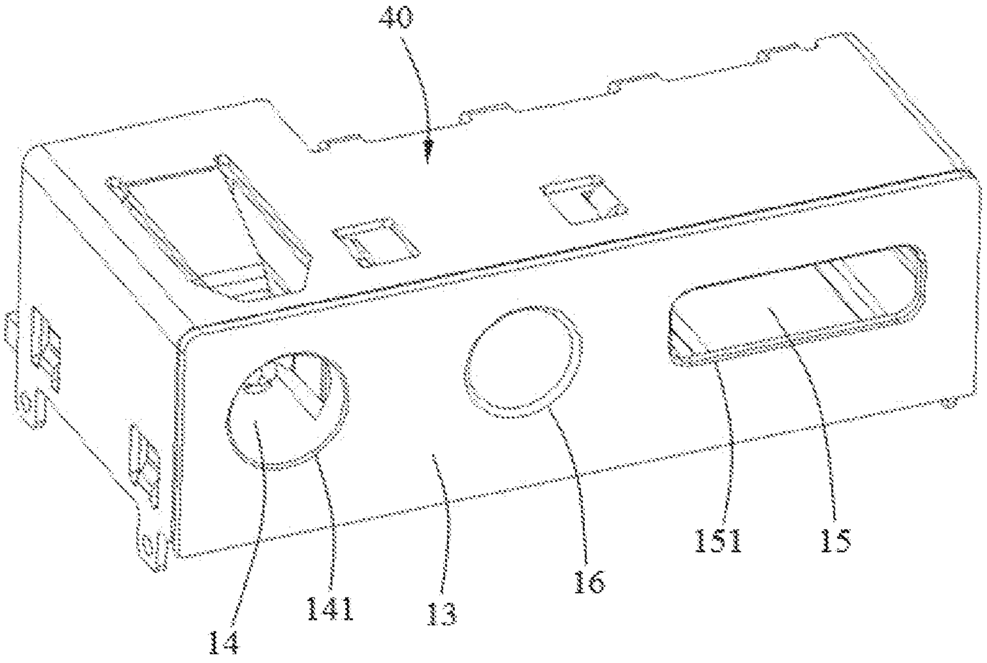
FIG. 9 is an assembly diagram of an electric connecting device of the present disclosure.

In addition, a rear side of the insulator 10 is further provided with a rear end mounting surface 17 and a protrusion portion 18 backwards protruding beyond the rear end mounting surface 17. The rear end mounting surface 17 is further provided with a mounting port 171 recessed inwards for mounting the USB plugging module 30. A stop portion 172 is further arranged in the mounting port 171 for stopping the USB plugging module 30, thus preventing the USB plugging module 30 from being mounted excessively forward into the mounting port 171. As shown in FIG. 8, the protrusion portion 18 is further provided with an inverted U-shaped slot 181, and an inner slot 182 and a central slot 183 located inside the inverted U-shaped slot 181 for mounting the terminal module 20. The inverted U-shaped slot 181, the inner slot 182 and the central slot 183 all penetrate through the first plugging cavity 14 from the back to the front, so that the terminal module 20 can be exposed in the first plugging cavity 14 to achieve electric plugging with a butt-joint end element (not shown in figure). The inverted U-shaped slot 181 includes a pair of side slots 184 and a top slot 185. The pair of side slots 184 are distributed at a left side and a right side of the central slot 183. The inner slot 182 is located between the central slot 183 and one of the side slots 184. The inner slot 182 and the side slot 184 are provided in adjacent and penetrate through each other, so that a detection terminal 23 in the inner slot 182 is convenient to be lapped with a ground terminal 21 in the adjacent side slot 184. The central slot 183 is concave-shaped and is internally provided with a projecting tongue. The bottom of the protrusion portion 18 is provided with a backward-protruding skirt portion 186. The skirt portion 186 is provided with a plurality of limiting dividers 187 for clamping the tail of the terminal module 20 to achieve fixed limiting.

In order to clamp the metal housing 40 better, in a preferred embodiment of the present disclosure, the rear side of the insulator 10 is further provided with a clamping portion 19 protruding from the rear end mounting face 17. A clamping groove 191 is formed between the clamping portion 19 and the rear end mounting surface 17, and the clamping groove 191 is located on one side of the mounting port 171 for clamping an edge of a rear cover 43 of the metal housing 40. In this way, the metal housing 40 can clamp the insulator 10 stably and reliably, the circumstance of warping and detaching is not easy to occur, and more effective protection can be provided.

The terminal module 20 includes a ground terminal 21, a power supply terminal 22, and a detection terminal 23 respectively plugged in the inverted U-shaped slot 181, the central slot 183 and the inner slot 182. Wherein the ground terminal 21 is provided with a pair of opposite contact arms 24 and a top arm 25 for connecting the two contact arms 24. The two contact arms 24 are sheet-shaped and respectively plugged in the pair of side slots 184. The top arm 25 is plugged in the top slot 185. One of the contact arms 24 is provided with a blanking hole 241 and an elastic arm 242 formed in the blanking hole 241. The elastic arm 242 extends from the front to the back. A front end of the elastic arm 242 is integrally connected on a front end of the contact arm 24, and a rear end of the elastic arm 242 is a free tail end A. Rear ends of the two contact arms 24 are provided with welding arms 243 extending downwards. The power supply terminal 22 is located in the central slot 183, and is provided with a cylindrical butt-join arm 221. The butt-joint arm 221 is located in the first plugging cavity 14 and located at a central position of the round interface 141. The detection terminal 23 is sheet-shaped and is provided with a detection arm 231. The detection arm 231 and the free tail end A of the elastic arm 242 are provided in adjacent and lapped with each other to reach the on-state. When plugged in the first plugging cavity 14, the butt-joint element applies pressure on the elastic arm 242 to force the elastic arm 242 away from the detection arm 231 to disconnect the elastic arm 242 and the detection arm 231 from each other.

The metal housing 40 is provided with a top cover 41, a pair of side covers 42, and a rear cover 43. The top surface 11 of the insulator 10 is covered with the top cover 41, and the pair of side surfaces 12 of the insulator 10 are covered with the side covers 42. Wherein the top cover 41 is provided with a folded sheet 44 formed by bending downwards and a spring sheet 45. The folded sheet 44 is used for being clamped into the latching groove 110 on the top surface 11 of the insulator 10 so as to achieve a fixed fit with the insulator 10. The spring sheet 45 downwardly extends into the through hole 111 on the top surface 11 of the insulator 10 and is located above the butt-joint arm 221. The rear cover 43 is formed by bending downwards from a rear side edge of the top cover 41, which covers the rear end mounting surface 17 of the insulator 10. An edge at one side of the rear cover 43 is clamped into the clamping groove 191 and thus cannot warp.

The USB plugging module 30 is provided with a butt-joint portion 31 and a limiting portion 32 downwardly extending out from a rear side of the butt-joint portion 31. The butt-joint portion 31 is mounted in the second plugging cavity 15 and is provided with a shielding housing 33. The shielding housing 33 extends backwards and covers the limiting portion 32. The shielding housing 33 is further provided with a pair of fixed arms 34 extending downwards. The fixed arms 34 cover two side surfaces of the limiting portion 32. The limiting portion 32 is housed in the mounting port 171 and is blocked and limited by the stop portion 172. Preferably, the butt-joint portion 31 of the USB plugging module 30 is provided with a Type-C interface.

In conclusion, by simultaneously providing the first plugging cavity 14 and the second plugging cavity 15 on the insulator 10, two different plugging functions can be satisfied, and the transmission of a DC power supply and the transmission of a USB signal are realized at the same time. Compared with an electric connecting device divided into two separately electric connectors, the integrated structure of the present disclosure can reduce the occupation of a circuit board space, and can also reduce the assembly cost of the product.

The above is only the preferred embodiment of the present disclosure and is not a limitation of the present disclosure in any form. Any person skilled in the art may make many possible changes and modifications to the technical solution of the present disclosure using the contents of the method revealed above without departing from the scope of the technical solution of the disclosure, which should fall within the scope of protection of the claims.

The invention claimed is:

1. An electric connecting device, comprising an insulator which is provided with a front end abutting surface and a rear end mounting surface, a terminal module housed in the insulator, and a USB plugging module installed in the insulator, wherein a first plugging cavity and a second plugging cavity distributed in a horizontal direction and a guide hole between the first plugging cavity and the second plugging cavity are arranged in the insulator; the first plugging cavity forwardly penetrates through the front end abutting surface and forms a round interface on the front abutting surface; the second plugging cavity forwards penetrates through the front end abutting surface and forms a USB interface on the front end abutting surface; and the round interface, the guide hole and the USB interface are linearly arranged from left to right, and wherein the insulator is further provided with a protrusion portion protruding backwards beyond the rear end mounting surface; the protrusion portion is provided with an inverted U-shaped slot, and an inner slot and a central slot located inside the inverted U-shaped slot; and the inverted U-shaped slot, the inner slot and the central slot all penetrate through the first plugging cavity from the back to the front so as to accommodate the terminal module.

2. The electric connecting device according to claim 1, wherein the front end abutting surface of the insulator is rectangular, and the insulator is further provided with a top surface and a pair of side surfaces; and a through hole is formed on the top surface and downwardly penetrates through the first plugging cavity.

3. The electric connecting device according to claim 1, wherein a mounting port recessed inwards is provided on the rear end mounting surface of the insulator, and a stop portion is arranged in the mounting port; the USB plugging module is housed in the mounting port, and is further provided with a butt-joint portion plugged into the second plugging cavity and a limiting portion abutting against the stop portion.

4. The electric connecting device according to claim 1, wherein the inverted U-shaped slot comprises a pair of side slots and a top slot; the pair of side slots are respectively distributed at a left side and a right side of the central slot; the inner slot is located between the central clot and one of the side slots; and the central slot is concave.

5. The electric connecting device according to claim 4, wherein the terminal module comprises a ground terminal, a power supply terminal, and a detection terminal; the power supply terminal is located at a central position of the round interface; and the detection terminal and the ground terminal are lapped with each other.

6. The electric connecting device according to claim 5, wherein the ground terminal is provided with a pair of opposite contact arms and a top arm for connecting the two contact arms; the two contact arms are sheet-shaped and respectively plugged in the pair of side slots; and the top arm is plugged in the top slot.

7. The electric connecting device according to claim 6, wherein one of the two contact arms is provided with a blanking hole and an elastic arm formed in the blanking hole; the elastic arm extends from the front to the back; a front end of the elastic arm is integrally connected to a front end of the contact arm; a rear end of the elastic arm is a free tail end; and the free tail end and the detection terminal are lapped with each other.

8. The electric connecting device according to claim 1, wherein the electric connecting device further comprises a metal housing covering the insulator; the metal housing is provided with a top cover, a pair of side covers and a rear cover; the top cover is provided with a spring sheet extending downward into the first plugging cavity; and the rear end mounting surface is covered with the rear cover.

9. The electric connecting device according to claim 8, wherein the rear side of the insulator is further provided with a clamping portion protruding from the rear end mounting surface; a clamping groove is formed between the clamping portion and the rear end mounting surface; and the edge of the rear cover is clamped in the clamping groove.

* * * * *